United States Patent [19]

Shigemoto et al.

[11] Patent Number: 5,100,941

[45] Date of Patent: Mar. 31, 1992

[54] POLYOLEFIN RESIN COMPOSITION

[75] Inventors: Hiromi Shigemoto; Keiji Kawamoto; Tetsuji Kasai, all of Yamaguchi, Japan

[73] Assignee: Mitsui Petrochemical Industries, Ltd., Tokyo, Japan

[21] Appl. No.: 548,217

[22] Filed: Jul. 5, 1990

[30] Foreign Application Priority Data

Jul. 5, 1989 [JP] Japan .................................. 1-173815

[51] Int. Cl.$^5$ ...................... C08K 5/3492; C08K 5/36
[52] U.S. Cl. .................................. 524/101; 524/323; 524/392
[58] Field of Search ...................... 524/101, 323, 392

[56] References Cited

U.S. PATENT DOCUMENTS

| | | | |
|---|---|---|---|
| 3,627,582 | 1/1972 | Gilles | 524/101 |
| 3,702,837 | 11/1972 | Giles | 524/100 |
| 4,025,486 | 5/1977 | Gilles | 524/101 |
| 4,032,505 | 6/1977 | Chaser | 524/101 |
| 4,039,538 | 8/1977 | Klinkenberg et al. | 524/101 |
| 4,385,143 | 5/1983 | Yachigo et al. | 524/101 |
| 4,415,686 | 11/1983 | Chaser | 524/101 |
| 4,520,151 | 5/1985 | Chaser | 524/101 |
| 4,529,533 | 7/1985 | Chaser | 524/101 |
| 4,581,391 | 4/1986 | Witman | 524/101 |
| 4,670,493 | 6/1987 | Van Asbroeck et al. | 524/392 |

FOREIGN PATENT DOCUMENTS

| | | | |
|---|---|---|---|
| 713136 | 7/1965 | Canada | 524/392 |
| 729735 | 3/1966 | Canada | 524/392 |

OTHER PUBLICATIONS

Patent Abstracts of Japan, vol. 13, No. 49 (C-565) [3397], 3 Feb. 1989.
WO-A-8202169 (The B.F. Goodrich Company) p. 4, line 28-p. 6, line 24.

*Primary Examiner*—Kriellion S. Morgan
*Attorney, Agent, or Firm*—Sherman and Shalloway

[57] ABSTRACT

This invention concerns a polyolefin resin composition composed essentially of
(A) a polyolefin resin,
(B) an alkyl disulfide compound represented by formula [I]

$$R^1-S-S-R^2 \qquad [I]$$

wherein $R^1$ and $R^2$ are the same or different and each denotes an alkyl group with 10 or more carbon atoms,
(C) a triazine compound represented by formula [II]

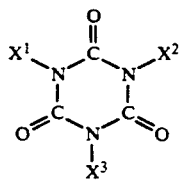

and/or a benzene compound represented by formula [III]

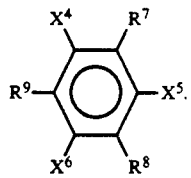

According to this invention, there is provided the stabilized polyolefin resin composition that can resistant to heat ageing for a long period of time without discoloring.

24 Claims, No Drawings

POLYOLEFIN RESIN COMPOSITION

FIELD OF THE INVENTION

This invention relates to a polyolefin resin composition, and a fiber, a film or other molded articles formed therefrom. More specifically, this invention relates to a stabilized polyolefin resin composition that can remain resistant to heat ageing for a long period of time without discoloring as well as various molded articles formed therefrom.

DESCRIPTION OF PRIOR ART

Polyolefin resins have found wide acceptance in fibers, films or other molded articles that are industrially produced on a large scale.

Meanwhile, fibers formed from a poly(4-methyl-1-pentene) resin are pleasant to the touch, and are therefore being developed as materials of bedclothes, sports wear, etc.

To the fibers of the polyolefin resins such as the poly(4-methyl-1-pentene) resin are added various stabilizers for improving properties such as resistance to heat ageing, etc. There is however a problem that when the polyolefin resin fibers, especially, the poly(4methyl-1-pentene) resin fibers, containing the conventional stabilizer are repeatedly washed, the stabilizer added is decomposed and gradually eluted into water, notably decreasing resistance to heat ageing.

Another problem is that as fibers of polyolefin resins such as the poly(4-methyl-1-pentene) resin, etc. easily discolor (turn pink or yellow) by nitric oxide, etc. in air, discoloration easily occurs by exhaust gases of automobiles, drying with an oil stove after washing, and so forth.

PROBLEMS THE INVENTION AIMS TO SOLVE

It is an object of this invention to provide a polyolefin resin composition that can keep stability for a long period of time, and various products formed therefrom.

Another object of this invention is to provide a polyolefin resin composition that can keep resistance to heat ageing for a long period of time, and various products formed therefrom.

Still another object of this invention is to provide a polyolefin resin composition that does not discolor or is discolored very little nitric oxide in air, etc., and various products formed therefrom.

The other object of this invention is to provide poly(4-methyl-1-pentene) resin fibers that exhibit little decrease in heat ageing resistance and scarcely discolor even if repeatedly washed.

Further objects of this invention will be made even clearer from the following explanation.

MEANS FOR SOLVING THE PROBLEMS

According to the studies of the present inventors, the aforesaid objects and advantages of this invention have been found to be achieved by a polyolefin resin composition composed essentially of the following (A), (B) and (C), (A) a polyolefin resin, (B) an alkyl disulfide compound represented by formula [I]

$$R^1-S-S-R^2 \qquad [I]$$

wherein $R^1$ and $R^2$ are the same or different and each denotes an alkyl group with 10 or more carbon atoms, and (C) a triazine compound represented by formula [II]

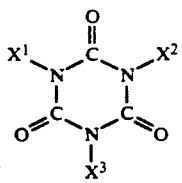

wherein $X^1$, $X^2$ and $X^3$ are the same or different and each denotes an aralkyl group of formula

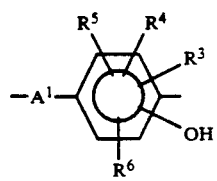

in which $A^1$ denotes an alkylene group with one or more carbon atoms, $R^3$ denotes an alkyl group with 1 to 10 carbon atoms which is bonded to a carbon atom adjacent to a carbon atom to which the hydroxyl group in the aralkyl group is bound, and $R^4$, $R^5$ and $R^6$ are the same or different and each denotes a hydrogen atom or an alkyl group with 1 to 10 carbon atoms, and/or a benzene compound represented by formula [III]

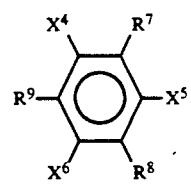

wherein $R^7$, $R^8$ and $R^9$ are the same or different and each denotes a hydrogen atom or an alkyl group with one or more carbon atoms, and $X^4$, $X^5$ and $X^6$ are the same or different and each denotes an aralkyl group of formula

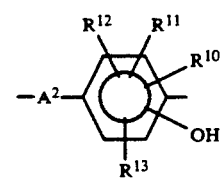

is which $A^2$ denotes an alkylene group with one or more carbon atoms, $R^{10}$ denotes an alkyl group with 1 to 10 carbon atoms which is bonded to a carbon atom adjacent to a carbon atom to which the hydroxyl group in the aralkyl group is bound, and $R^{11}$, $R^{12}$ and R—are the same or different and each denotes a hydrogen atom or an alkyl group with 1 to 10 carbon atoms.

This invention is hereinafter described in more detail.

In the resin composition of this invention, the polyolefin resin (hereinafter abbreviated at times as "A component") can be an ordinary polyolefin resin that is ordinarily used in fibers, films or other molded articles. It is thus suitable that the polyolefin resin has a molecular weight of about 100,000 to about 1,000,000, preferably about 200,000 to about 800,000.

Concrete examples of A component include a homopolymer of an alpha-olefin such as ethylene, propylene, 1-butene, 1-pentene, 1-hexene, 3-methyl-1-butene, 3-methyl-1-pentene, 3-ethyl-1-pentene, 4-methyl-1-pentene or 3-ethyl-1-hexene, and a copolymer of two or more types of these alpha-olefins. Among them, the homopolymer of 4-methyl-1-pentene and the copolymer of 4-methyl-1-pentene as a main component and the other alpha-olefin are most preferable for the stabilized resin composition of this invention. In said poly(4-methyl-1-pentene) or its copolymer, the proportion of 4-methyl-1-pentene is about 70 mol% or more, preferably about 80 mol% or more.

The alkyl disulfide compound (B) (hereinafter abbreviated at times as "B component" of formula [I] used in the resin composition of this invention is a relatively stable compound that is not decomposed even when in contact with water such as city water for a long period of time and/or repeatedly. In the above formula [I], $R^1$ and $R^2$ are the same or different and each denotes a linear or branched alkyl group with 10 or more carbon atoms, most preferablly 12 to 18 carbon atoms.

Concrete examples of B component include dilauryl disulfide, dimyristyl disulfide, distearyl disulfide, laurylmyristyl disulfide, laurylpalmity disulfide, laurylstearyl disulfide, palmitylstearyl disulfide and myristylpalmityl disulfide. Of these, distearyl disulfide is preferable. They may be used either singly or in combination.

In the resin composition of this invention, the polyolefin resin as A component is blended with the alkyl disulfide compound as B component and the triazine compound and/or the benzene compound (they are together abbreviated at times as (37 C component"). Compared to the single use of B component or C component, the combined use of B component and C component can develop excellent performance such that resistance to heat ageing of the polyolefin is greatly improved and discoloration is not observed for a long period of time.

One type of C component is a triazine compound (hereinafter abbreviated at times as "C-1 component") represented by formula (II).

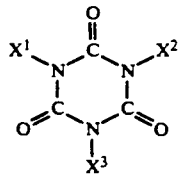

[II]

In formula [II], $X^1$, $X^2$ and $X^3$ are the same or different and each denotes an aralkyl group of formula:

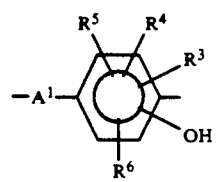

In the above aralkyl group, $A^1$ denotes an alkylene group with one or more carbon atoms. $R^3$ denotes an alkyl group with 1 to 10 carbon atoms, preferably 1 to 6 carbon atoms, which alkyl group is bonded to a carbon atom adjacent to a carbon atom to which the hydroxyl group is bound. The alkyl group of $R^3$ may be either linear or branched. The hydroxyl group (OH) in the aralkyl group is preferably in the 3- or 4-position. Moreover, $R^4$, $R^5$ and $R^6$ are the same or different and each denotes a hydrogen arom or an alkyl group with 1 to 10 carbon atoms, preferably 1 to 6 carbon atoms. The alkyl groups of $R^4$, $R^5$ and $R^6$ may be either linear or branched.

The triazine compound (C-1 component) of formula (II) is itself generally a stable compound that is not decomposed when in contact with water such as city water for a long period of time and/or repeatedly. Concrete examples of C-1 component include 1,3,5-tris (2,-6-dimethyl-3-hydroxy-4-t-butylbenzyl)isocyanurate, 1,3,5-tris(3,5-di-t-butyl-4-hydroxybenzyl)isocyanurate and 1,3,5-tris(3-methyl-5-t-butyl-4-hydroxybenzyl-)isocyanurate. Of these, 1,3,5-tris(2,6-dimethyl-3-hydroxy-4-t-butylbenzyl)iso cyanurate and 1,3,5-tris(3,5-di-t-butyl-4-hydroxybenzyl)isocyanurate. They may be used either singly or in combination.

The other component that is used either together with said C-1 component or instead of said C-1 component is a benzene compound (hereinafter abbreviated at times as "C-2 component") represented by formula [III]

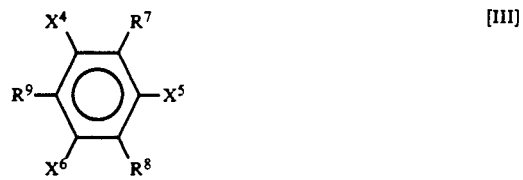

[III]

In formula (III), $R^7$, $R^8$ and $R^9$ are the same or different and each denotes a hydrogen atom or an alkyl group with one or more carbon atoms, preferably 1 to 6 carbon atoms. $X^4$, $X^5$ and $X^6$ are the same or different and each denotes an aralkyl group of formula:

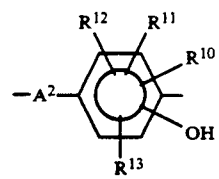

In the above aralkyl group, $A^2$ denotes an alkylene group with one or more carbon atoms. $R^{10}$ denotes an alkyl group with 1 to 10 carbon atoms, preferably 1 to 6 carbon atoms, which alkyl group is bonded to a carbon atom adjacent to a carbon atom to which the hydroxyl group in the aralkyl group is bound. The hydroxyl group (OH) in the aralkyl group is preferably in the 3- or 4-position. The alkyl group of $R^{10}$ may be either linear or branched. $R^{11}$, $R^{12}$ and $R^{13}$ are the same or different and each denotes a hydrogen atom or an alkyl group with 1 to 10 carbon atoms, preferably 1 to 6 carbon atoms. The alkyl groups of $R^{11}$, $R^{12}$ and $R^{13}$ may be either linear or branched.

The benzene compound (C-2 component) represented by formula [III] is itself generally a stable compound that is not decomposed even when in contact with water such as city water for a long period of time and/or repeatedly. Concrete examples of C-2 component include 1,3,5-trimethyl-2,4,6-tris(3,5-di-t-butyl-4-hydroxybenzyl)benzene, 1,3,5-triethyl-2,4,6-tris(3,5di-t-butyl-4′-hydroxybenzyl) benzene, 1,3,5-trimethyl-2,4,6-tris(2,6-dimethyl-3-hydroxy-4-t-butylbenzyl)benzene and 1,3,5-trimethyl-2,4,6-tris(3-methyl-5-t-butyl-4-hydroxybenzyl)benzene. Of these, 1,3,5-trimethyl-2,4,6-tris(3,5-di-t-butyl-4-hydroxybenzyl)benzene is preferable. They may be used either singly or in combination.

In this invention, the resin composition can be obtained by blending the polyolefin resin (A component) with B and C components. Said resin composition can keep resistance to heat ageing for a long period of time and besides does not discolor. Such properties cannot be obtained by using the other stabilizers.

The resin composition of this invention can be formed by blending the molten polyolefin resin (A component) with B and C components either in any optional sequence or simultaneously.

The amount of B component (triazine compound) being blended with the polyolefin resin (A component) is about 0.01 to about 5 parts by weight, preferably about 0.05 to about 3 parts by weight per 100 parts by weight of the polyolefin resin. The amount of C component is about 0.01 to about 5 parts by weight, preferably about 0.05 to about 3 parts by weight per 100 parts by weight of the polyolefin resin. C component may be C-1 component or C-2 component alone or a mixture of C-1 and C-2 components.

When in the resin composition of this invention the polyolefin resin is a poly(4-methyl-1-pentene) resin, it is especially preferable that per 100 parts by weight of the resin, the amount of B component is about 0.1 to about 1 part by weight and the amount of C component (benzene compound) is about 0.1 to about 1 part by weight.

The resin composition of this invention is composed essentially of said A component, B component and C component, and may further contain small amounts of other additives that are ordinarily blended with the polyolefin resin.

One of the other additives can be a metallic soap. Examples of the metallic soap are alkali metal salts, alkaline earth metal salts and other metal salts of saturated or unsaturated carboxylic acids with 12 to 40 carbon atoms. The saturated or unsaturated carboxylic acids with 12 to 40 carbon atoms may have a substitutent such as a hydroxyl group. Concrete examples of the saturated or unsaturated carboxylic acids with 12 to 40 carbon atoms include higher aliphatic acids such as stearic acid, oleic acid, lauric acid, caplic acid, arachidonic acid, palmitic acid, behenic acid, 12-hydroxystearic acid and montanic acid. Examples of the metals that form salts by reaction with these higher aliphatic acids include alkaline earth metals such as magnesium, calcium and barium, alkali metals such as sodium, potassium and lithium, cadmium, zinc and lead. The amount of the metallic soap is usually 0.01 to 3 parts by weight, preferably 0.03 to 1 part by weight per 100 parts by weight of the polyolefin resin (A component).

The resin composition of this invention may further contain the other additives unless the objects of this invention are impaired. Examples of the additives are a neucleating agent, a plasticizer, a heat stabilizer, a weathering stabilizer, a lubricant, an antistatic agent, a demisting agent, an inorganic or organic filler, a dyestuff and a pigment.

The polyolefin resin composition in this invention can be obtained by a method known per se. Examples of said method are a method in which the above components are blended by means of a V-blender, a ribbon blender, a Henschel mixer or a tumbling blender, a method in which the components are blended by said blender and then granulated with an extruder, and a method in which the components are melt-kneaded by a monoaxial extruder, a polyaxial extruder, a kneader of a Banbury mixer, and then granulated or pulverized.

The polyolefin resin composition of this invention can be molded into fibers, films, sheets, bottles and other products by methods known per se.

For example, the fibers can be formed by spinning the polyolefin resin composition through various means. Examples of the spinning method are a method in which a heat-melted polymer fluid of the polyolefin resin composition is extruded from a spinning die and directly cooled and solidified, a method in which the fluid is passed through a coagulating liquid to coagulate it, and a method in which a solution of a starting polyolefin resin composition dissolved in an appropriate solvent is extruded from a spinning die and the solvent is evaporated with hot air.

The thus obtained polyolefin resin fibers are not decreased in resistance to heat ageing when washed repeatedly. This is believed to attribute to the synergistic effect exhibited by the combination of the alkyl disulfide compound (B component) and the triazine compound (C-1 component) or the combination of the alkyl disulfide compound (B component) and the benzene compound (C-2 component) which are added as the stabilizer.

Moreover, the alkyl disulfide compound (B component), the triazine compound (C-1 component) and the benzene compound (C-2 component) added as the stabilizer are not reacted with $NO_x$ gases and amine comounds contained in oils used during the spinning step. Accordingly, even if the polyolefin resin fibers of this invention are dried with a gas burner, etc. after washed, they do not discolor at all.

In consequence, the fibers formed from the polyolefin resin composition of this invention can be used as starting materials of bedclothes, sports wear, diapers, industrial filters, quilting coats, quilting jumpers, handbags, wiping clothes, simple clothing, medical gowns, covers for operation, etc.

EFFECTS OF THE INVENTION

This invention can provide the polyolefin resin composition that can keep resistance to heat ageing for a long period of time and do not discolor by blending the polyolefin resin (A component) with the combination of the specific alkyl disulfide compound (B component) and the specific triazine compound (C-1 component and/or the benzene compound (C-2 component), as well as the molded articles formed therefrom.

The following Examples and Comparative Examples illustrate this invention specifically.

EXAMPLE 1

One hundred parts by weight of a 4-methyl-1-pentene polymer powder (hereinafter abbreviated as "PMP") having MFR (melt flow ratio: 260° C.) of 5 g/10 min, 0.10 part by weight of distearyl disulfide (hereinafter abbreviated as "DDS"), 0.20 part by weight of 1,3,5-tris(3,5-di-t-butyl-4-hydroxybenzyl)isocyanurate (hereinafter abbreviated as "GRI") and 0.03 part by weight of calcium stearate (hereinafter abbreviated as "SCA") were mixed by a Henschel mixer (50 liters) at high speed for 1 minute.

Subsequently, the mixture was kneaded and granulated by a biaxial extruder (PCM 45: a machine manufactured by Ikegai Iron Works, Ltd., a resin temperature of 290° C.) to obtain PMP pellets having MFR (260° C.) of 180 g/10 min.

The thus obtained PMP pellets were charged into an extruder of 300° C. having a diameter of 65 mm and heat-melted and spun as follows.

Using an extruder in which 1,000 orifices each having a diameter of 0.3 mm were aligned at a pitch of 1 mm in a nozzle disposed on a die, the molten polymer was jetted from the orifice at a rate of 0.2 g/min/orifice. A heating steam of 280° C. was injected and blown from slits on both sides of the orifice to pull and thin the molten polymer. The fiber group was collected on a rotary cooling drum to form a web 1.0 in width and 40 g/m² in weight. The die temperature was 310° C. and the pressure of the heating steam was 2.0 kg/cm². The resulting web had an average fiber diameter of 0.4 micrometers.

The resistance to heat ageing after washing and the change of color into pink were measured for the thus obtained web by the following methods. The results are indicated in Table 1.

(1) Test for resistance to heat ageing after washing in accordance with JIS L1096:

A washing machine (YURENDORY, a tradename for a machine of Sanyo Electric Co., Ltd.) was charged with 50 g of a detergent (ZAB, a tradename for a product of Kao Soap Co., Ltd.) and hot water of 50° C. The obtained web was placed therein, strongly stirred for 20 minutes, and then washed with water for 5 minutes. After this operation was repeated 30 times, the web was withdrawn and dried at room temperature. Subsequently, the web was put in an air oven of 160° C., and a time that lapsed until deterioration of appearance occurred was observed with an unaided eye.

(2) Test for change of color into pink:

The obtained web was hanged just above an oil stove, and a time that lapsed until appearance of the web turned pink.

EXAMPLE 2

Example 1 was repeated except that 1,3,5-trimethyl-2,4,6-tris (3,5-di-t-butyl-4-hydroxybenzyl)benzene (hereinafter abbreviated as "TTA") was used instead of GRI. The results are indicated in Table 1.

EXAMPLE 3

Example 1 was repeated except that 1,3,5-tris(2,6-dimethyl-3-hydroxy-4-t-butylbenzyl)isocyanurate (hereinafter abbreviated as "TBI") was used instead of GRI. The results are indicated in Table 1.

COMPARATIVE EXAMPLE 1

Example 1 was repeated except that tetrakis[methylene-3-(3,5-di-t-butyl-4-hydroxyphenyl)propionate]methane (hereinafter abbreviated as "TMM") was used as a stabilizer instead of GRI. The results are indicated in Table 1.

COMPARATIVE EXAMPLE 2

Example 1 was repeated except that pentaerythritol tetralauryl thiopropionate (hereinafter abbrefiated as "PTT") was used as a stabilizer instead of DSS. The results are indicated in Table 1.

TABLE 1

|  | Example 1 | Example 2 | Example 3 | Comparative Example 1 | Comparative Example 2 |
|---|---|---|---|---|---|
| Additives | DSS GRI SCA | DSS TTA SCA | DSS TBI SCA | DSS TMM SCA | PTT GRI SCA |
| Test for resistance to heat ageing after washing (hrs.) | 150 or more | 150 or more | 150 or more | 150 or more | 9 |
| Test for change of color into pink *1 | It does not occur for 3 months | It does not occur for 3 months | It does not occur for 3 months | It occurs in 2 days | It does not occur for 3 months |

*1: Test for change of color into pink was stopped in 3 months.

What we claim is:

1. A polyolefin resin composition consisting essentially of
(A) a polyolefin resin,
(B) an alkyl disulfide compound represented by formula (I)

$$R^1-S-S-R^2 \quad (I)$$

wherein $R^1$ and $R^2$ are the same or different and each denotes an alkyl group with 10 or more carbon atoms, and
(C) benzene compound represented by formula (III)

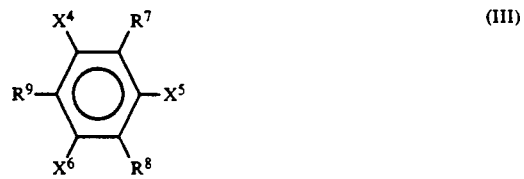

(III)

wherein $R^7$, $R^8$ and $R^9$ are the same or different and each denotes a hydrogen atom or an alkyl group with one or more carbon atoms, and $X^4$, $X^5$ and $X^6$ are the same or different and each denotes an aralkyl group of formula

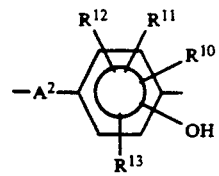

in which $A^2$ denotes an alkylene group with one or more carbon atoms, $R^{10}$ denotes an alkyl group with 1 to 10 carbon atoms which is bonded to a carbon atom adjacent to a carbon atom to which the hydroxyl group in the aralkyl group is bound, and $R^{11}$, $R^{12}$ and $R^{13}$ are the same or different and each denotes a hydrogen atom or alkyl group with 1 to 10 carbon atoms.

2. The polyolefin resin composition of claim 1 wherein the amount of the alkyl disulfide compound is 0.01 to 5 parts by weight per 100 parts by weight of the polyolefin resin.

3. The polyolefin resin composition of claim 1 wherein the amount of the alkyl disulfide compound is 0.05 to 3 parts by weight per 100 parts by weight of the polyolefin resin.

4. The polyolefin resin composition of claim 1 wherein the amount of the dialkyl disulfide compound is 0.01 to 5 parts by weight and the amount of the benzene compound is 0.01 to 5 parts by weight each per 100 parts by weight of the polyolefin resin.

5. The polyolefin resin composition of claim 1 wherein the amount of the dialkyl disulfide compound is 0.05 to 3 parts by weight and the amount of the benzene compound is 0.05 to 3 parts by weight per 100 parts by weight of the polyolefin resin.

6. The polyolefin resin composition of claim 1 wherein the polyolefin resin is a poly(4-methyl-1-pentene) resin.

7. A fiber formed from the polyolefin resin composition recited in any of claims 1, 2, 3, 4 or 5.

8. A film formed from the polyolefin resin composition recited in any one of claims 1, 2, 3, 4 or 5.

9. A fiber formed from the polyolefin resin composition according to claim 1 wherein the polyolefin resin (A) is poly(4-methyl-1-pentene) resin.

10. A molded article formed from the polyolefin resin composition recited in any one of claim 1, 2, 3, 6, 7, 8 or 9.

11. A film formed from the polyolefin resin composition according to claim 1 wherein the polyolefin resin (A) is poly(4-methyl-1-pentene) resin.

12. A molded article formed from the polyolefin resin composition according to claim 1 wherein the polyolefin resin (A) is poly(4-methyl-1-pentene) resin.

13. A polyolefin resin composition consisting essentially of
(A) a polyolefin resin,
(B) an alkyl disulfide compound represented by formula (I)

wherein $R^1$ and $R^2$ are the same or different and each denotes an alkyl group with 10 or more carbon atoms, and (C) a triazine compound represented by formula (II)

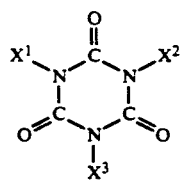

wherein $X^1$, $X^2$ and $X^3$ are the same or different and each denotes an aralkyl group of formula

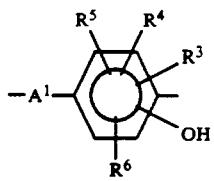

in which $A^1$ denotes an alkylene group with one or more carbon atoms, $R^3$ denotes an alkyl group with 1 to 10 carbon atoms which is bonded to a carbon atom adjacent to a carbon atom to which the hydroxyl group in the aralkyl group is bound, and $R^4$, $R^5$ and $R^6$ are the same or different and each denotes a hydrogen atom or an alkyl group with 1 to 10 carbon atoms.

14. The polyolefin resin composition of claim 13 wherein the amount of the alkyl disulfide compound is 0.01 to 5 parts by weight per 100 parts by weight of the polyolefin resin.

15. The polyolefin resin composition of claim 13 wherein the amount of the alkyl disulfide compound is 0.05 to 3 parts by weight per 100 parts by weight of the polyolefin resin.

16. The polyolefin composition of claim 13 wherein the amount of the dialkyl disulfide compound is 0.01 to 5 parts by weight and the amount of the triazine compound is 0.01 to 5 parts by weight each per 100 part by weight of the polyolefin resin.

17. The polyolefin composition of claim 13 wherein the amount of the dialkyl disulfide compound is 0.05 to 3 parts by weight and the amount of the triazine compound is 0.05 to 3 parts by weight, each per 100 part by weight of the polyolefin resin.

18. The polyolefin resin composition of any one of claims 13, 14, 15, 16 or 17 wherein the polyolefin resin is a poly(4-methyl-1-pentene) resin.

19. A fiber formed from the polyolefin resin composition recited in any of claims 13, 14, 15, 16 and 17.

20. A film formed from the polyolefin resin composition recited in any one of claims 13, 14, 15, 16 or 17.

21. A molded article formed from the polyolefin resin composition recited in any one of claims 13, 14, 15, 16 or 17.

22. A fiber formed from the polyolefin resin composition according to claim 13 wherein the polyolefin resin (A) is a poly(4-methyl-1-pentene) resin.

23. A film formed from the polyolefin resin composition according to claim 13 wherein the polyolefin resin (A) is a poly(4-methyl-1-pentene) resin.

24. A molded article formed from the polyolefin resin composition according to claim 13 wherein the polyolefin resin (A) is a poly(4-methyl-1-pentene) resin.

* * * * *